(12) United States Patent
Savolainen (10) Patent No.: US 9,584,400 B2
(45) Date of Patent: Feb. 28, 2017

(54) METHOD AND APPARATUS FOR SELECTING A ROUTER IN AN INFINITE LINK NETWORK

(75) Inventor: Teemu Ilmari Savolainen, Nokia (FI)

(73) Assignee: Nokia Technologies Oy, Espoo (FI)

( * ) Notice: Subject to any disclaimer, the term of this patent is extended or adjusted under 35 U.S.C. 154(b) by 57 days.

(21) Appl. No.: 14/417,281

(22) PCT Filed: Aug. 31, 2012

(86) PCT No.: PCT/IB2012/054496
§ 371 (c)(1),
(2), (4) Date: Jan. 26, 2015

(87) PCT Pub. No.: WO2014/033501
PCT Pub. Date: Mar. 6, 2014

(65) Prior Publication Data
US 2015/0195187 A1    Jul. 9, 2015

(51) Int. Cl.
*H04L 12/733* (2013.01)
*H04W 40/02* (2009.01)
*H04L 12/721* (2013.01)
*H04W 84/22* (2009.01)

(52) U.S. Cl.
CPC ........... *H04L 45/122* (2013.01); *H04L 45/124* (2013.01); *H04W 40/02* (2013.01); *H04W 84/22* (2013.01)

(58) Field of Classification Search
None
See application file for complete search history.

(56) References Cited

U.S. PATENT DOCUMENTS

| | | | |
|---|---|---|---|
| 6,961,573 B1 | 11/2005 | Moon et al. | |
| 7,978,725 B2 * | 7/2011 | Gong | H04L 45/122 370/238 |
| 8,930,572 B2 * | 1/2015 | Yonge, III | H04L 12/2801 370/236 |
| 2005/0275532 A1 | 12/2005 | Ferri et al. | |
| 2007/0206503 A1 | 9/2007 | Gong et al. | |
| 2008/0316997 A1 | 12/2008 | Zeng et al. | |

(Continued)

FOREIGN PATENT DOCUMENTS

WO    2006122287 A2    11/2006

OTHER PUBLICATIONS

International Search Report and Written Opinion received for corresponding Patent Cooperation Treaty Application No. PCT/IB2012/054496, dated Sep. 23, 2013, 12 pages.

(Continued)

*Primary Examiner* — Brian Roberts
(74) *Attorney, Agent, or Firm* — Alston & Bird LLP (57) ABSTRACT

A method, apparatus and computer program product are therefore provided in order to provide for efficient selection of a router (206, 208) for providing network services in an infinite link network. A mobile terminal (202) may identify nearby routers (206, 208) using link layer distance metrics in order to select an optimal router. The link layer distance metrics may provide a number of "hops" or other measure of physical distance between the mobile terminal (202) and the router (206, 208) in order to route packets to a router that is physically closest to the mobile terminal, which may result in a minimized number of relays for a packet transmitted from the terminal to the router, and vice-versa.

17 Claims, 3 Drawing Sheets

(56) References Cited

U.S. PATENT DOCUMENTS

| | | | |
|---|---|---|---|
| 2009/0003214 A1* | 1/2009 | Vaswani | H04L 45/00 370/236 |
| 2009/0154359 A1 | 6/2009 | Strutt et al. | |
| 2009/0232014 A1 | 9/2009 | Kutschenreuter et al. | |
| 2010/0118727 A1 | 5/2010 | Draves, Jr. et al. | |
| 2010/0278118 A1 | 11/2010 | Gossain et al. | |

OTHER PUBLICATIONS

Narten et al., "Neighbor Discovery for IP version 6 (IPv6)", RFC 4861, Network Working Group, Sep. 2007, pp. 97 pages.

Thomson et al., "IPv6 Stateless Address Autoconfiguration", RFC 4862, Network Working Group, Sep. 2007, pp. 1-30.

Draves et al., "Default Router Preferences and More-Specific Routes", RFC 4191, Network Working Group, Nov. 2005, pp. 1-15 pages.

DROMS, "Dynamic Host Configuration Protocol", RFC 2131, Network Working Group, Mar. 1997, pp. 1-45.

Shelby et al., "Neighbor Discovery Optimization for Low Power and Lossy Networks (6LoWPAN)", Internet Draft, draft-ietf-6lowpan-nd-18, RFC 4944, 6LoWPAN Working Group, Oct. 24, 2011, pp. 1-59 pages.

Thaler et al., "Default Address Selection for Internet Protocol version 6 (IPv6)", Internet Draft, draft-ietf-6man-rfc3484bis-02.txt, RFC 3484, Network Working Group, Apr. 11, 2012, pp. 1-30 pages.

Fotou et al., "Impact of Link Layer on Routing Protocols in Wireless Sensor Network", Computer Science and Information Engineering, 2009 WRI World Congress, vol. 1, Mar. 31-Apr. 2, 2009, pp. 49-52.

"Neighbour Discovery Protocol", Fengnet.com, Retrieved on May 24, 2016, Webpage available at:http://fengnet.com/book/CCIE%20Professional%20Development%20Routing%20TCPIP%20Volume%20I/ch02lev1sec5.html.

Extended European Search Report received for corresponding European Patent Application No. 12883937.0, dated Mar. 18, 2016, 6 pages.

Xi et al., "Wireless Multihop Internet Access: Gateway Discovery, Routing, and Addressing", In Proc. World wireless congress, May 2002, 6 pages.

\* cited by examiner

METHOD AND APPARATUS FOR SELECTING A ROUTER IN AN INFINITE LINK NETWORK

RELATED APPLICATION

This application was originally filed as Patent Cooperation Treaty Application No. PCT/IB2012/054496 filed Aug. 31, 2012.

TECHNOLOGICAL FIELD

An example embodiment of the present invention relates generally to network router selection and, more particularly, to router selection for accessing a network address in an infinite link layer environment.

BACKGROUND

Advances in technology have allowed for increasingly complex features to be integrated into mobile terminals. As more and more devices are powerful enough to access and display Internet content, various ways of connecting these devices to one another and to the Internet have been devised. It is common for devices to have the capability to access networks such as the Internet via cellular networks, such as Third Generation (3G) and Long Term Evolution (LTE) networks, or by wireless protocols such as the 802.11 network family.

However, these network access methods require a central provisioning authority, such as a cellular tower or a wireless router. As such, network-enabled devices are constrained by the availability of these central authorities. In response, new network models have been developed to provide these devices with increased access and flexibility. One such model is the "infinite link layer" model that represents all devices in an ad-hoc network environment, where devices may directly communicate with one another and forward network data. In such an environment, devices are not constrained by central connections to, for example, a single wireless router. In contrast, a single device may be able to connect with multiple devices, some of which may be routers that provide access to a traditional packet-switched Internet Protocol network, such as the Internet. If the device wishes to communicate with the Internet, a particular wireless router must be chosen. However, the infinite link layer provides unique challenges in the selection of such routers, because a given device may not be able to address every router available on the infinite link network. In practice, there may be some nodes of the network that cannot ever speak to one another due to packet replication limits (e.g., limiting a given message to a particular number of "hops" to conserve network bandwidth). As such, traditional methods for router selection (e.g., choosing from a list of preferred routers) may not be applicable, since the device may not have access to certain routers, due to the routers being more than the maximum number of hops away from the device.

BRIEF SUMMARY

A method, apparatus and computer program product are therefore provided according to an example embodiment of the present invention in order to provide for efficient selection of a router for providing network services in an infinite link network. A mobile terminal may identify nearby routers using link layer metrics in order to select an optimal router. The link layer metrics may provide a number of "hops" or other measure of physical distance between the terminal and the router in order to minimize a number of signal relays for a packet transmitted from the terminal to the router, and vice-versa. Additionally or alternatively, other link layer metrics such as energy consumption or radio path characteristics may be utilized to select a router.

Example embodiments of the invention may include a method. The method may include identifying at least two routers accessible to a source node via a mesh network, determining one or more link layer metrics for links between the source node and each of the at least two routers, determining, using the link layer metrics, a selected router from among the at least two routers; and causing traffic to be routed from the source node to a network other than the mesh network through the selected router in response to determining the selected router from among the at least two routers. The method may also include determining network layer metrics for the at least two routers, determining that the link layer metrics override the network layer metrics, and using the link layer metrics to select a router from the at least two routers for routing traffic from the source node to the network other than the mesh network in response to the link layer metrics overriding the network layer metrics. The link layer metrics may serve as a tie-breaker when there is a tie among the at least two routers based on the network layer metrics. The network layer metrics may include a priority level for reach router. The link layer metrics may include a number of hops between the source node and each of the at least two routers, and the selected router may be the router associated with the least number of hops. The routing operation may be performed according to a Source Address Selection process and the Source Address Selection process may be modified in response to determining the selected router. The mesh network may be an infinite link layer network. The link layer metric may be at least one of a physical distance, a hop count, an energy consumption value, or a radio path characteristic.

Further example embodiments of the invention may include an apparatus. The apparatus may include at least one processor and at least one memory including computer program instructions. The at least one memory and the computer program instructions may be configured to, with the at least one processor, cause the apparatus at least to identify at least two routers accessible to a source node via a mesh network, determine one or more link layer metrics for links between the source node and each of the at least two routers, determine, using the link layer metrics, a selected router from among the at least two routers, and cause traffic to be routed from the source node to a network other than the mesh network through the selected router in response to determining the selected router from among the at least two routers. The apparatus may be further configured to determine network layer metrics for the at least two routers, determine that the link layer metrics override the network layer metrics, and, use the link layer metrics to select a router from the at least two routers for routing traffic from the source node to the network other than the mesh network in response to the link layer metrics overriding the network layer metrics. The link layer metrics may serve as a tie-breaker when there is a tie among the at least two routers based on the network layer metrics. The network layer metrics may include a priority level for reach router. The link layer metrics may include a number of hops between the source node and each of the at least two routers, and the selected router may be the router associated with the least number of hops. The routing operation may be performed according to a Source Address Selection process and the Source Address Selection process may be modified in response to determining the selected router. The mesh network may be an infinite link layer network. The apparatus may be a mobile phone. The link layer metric may be at least one of a physical distance, a hop count, an energy consumption value, or a radio path characteristic.

Additional example embodiments of the invention may include a computer program product. The computer program product may include at least one computer-readable storage medium bearing computer program instructions embodied therein for use with a computer. The computer program instructions may include program instructions configured to identify at least two routers accessible to a source node via a mesh network, determine one or more link layer metrics for links between the source node and each of the at least two routers, determine, using the link layer metrics, a selected router from among the at least two routers, and cause traffic to be routed from the source node to a network other than the mesh network through the selected router in response to determining the selected router from among the at least two routers. The computer program product may be further configured to determine network layer metrics for the at least two routers, determine that the link layer metrics override the network layer metrics, and use the link layer metrics to select a router from the at least two routers for routing traffic from the source node to the network other than the mesh network in response to the link layer metrics overriding the network layer metrics. The link layer metrics may serve as a tie-breaker when there is a tie among the at least two routers based on the network layer metrics. The network layer metrics may include a priority level for reach router. The link layer metrics may include a number of hops between the source node and each of the at least two routers, and the selected router may be the router associated with the least number of hops. The link layer metric may be at least one of a physical distance, a hop count, an energy consumption value, or a radio path characteristic.

Example embodiments of the invention may also include an apparatus. The apparatus may include means for identifying at least two routers accessible to a source node via a mesh network, means for determining one or more link layer metrics for links between the source node and each of the at least two routers, means for determining, using the link layer metrics, a selected router from among the at least two routers, and means for causing traffic to be routed from the source node to a network other than the mesh network through the selected router in response to determining the selected router from among the at least two routers.

BRIEF DESCRIPTION OF THE DRAWINGS

Having thus described certain embodiments of the invention in general terms, reference will now be made to the accompanying drawings, which are not necessarily drawn to scale, and wherein:

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (e.g., volatile or non-volatile memory device), can be differentiated from a "computer-readable transmission medium," which refers to an electromagnetic signal.

A method, apparatus and computer program product are provided in accordance with an example embodiment of the present invention in order to select a router in an infinite link environment. In some aspects, the "selection" operation refers to choosing a router as a "default" route for data packets. In this regard, a method, apparatus and computer program product of an example embodiment may determine one or more link layer metrics for routers in the infinite link layer environment, such as link distance metrics to each router. The metrics may be used to select a router for accessing another network, such as the Internet.

The system of an embodiment of the present invention may include an apparatus 100 as generally described below in conjunction with FIG. 1 for performing one or more of the operations set forth by FIGS. 2-3 and also described below. In this regard, the apparatus 100 may be embodied by a mobile terminal. In this embodiment, the mobile terminal may be in communication with a display and/or a data network, either directly, such as via a wireless or wireline connection, or indirectly via one or more intermediate computing devices. In this regard, the display and the mobile terminal may be parts of the same system in some embodiments. However, the apparatus 100 may alternatively be embodied by another computing device that is in communication with the display and the mobile terminal, such as via a wireless connection, a wireline connection or the like. For example, the apparatus may be a mobile telephone, a personal digital assistant (PDA), a pager, a laptop computer, a tablet computer, or any of numerous other hand held or portable communication devices, computation devices, content generation devices, content consumption devices or combinations thereof.

Figure 1:
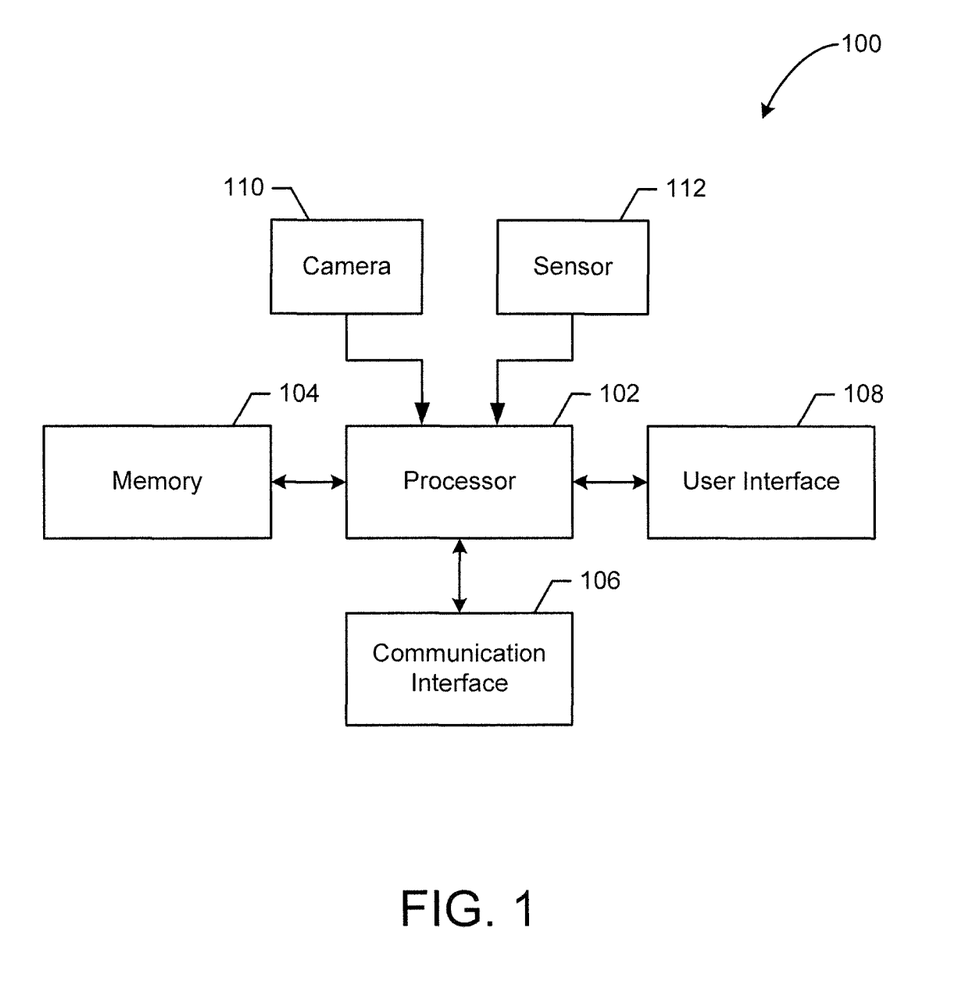
FIG. 1 is a block diagram of an apparatus that may be specifically configured in accordance with an example embodiment of the present invention.

It should also be noted that while FIG. 1 illustrates one example of a configuration of an apparatus 100 for selecting a router, numerous other configurations may also be used to implement other embodiments of the present invention. As such, in some embodiments, although devices or elements are shown as being in communication with each other, hereinafter such devices or elements should be considered to be capable of being embodied within the same device or element and thus, devices or elements shown in communication should be understood to alternatively be portions of the same device or element.

Referring now to FIG. 1, the apparatus 100 for selecting a router in an infinite link environment according to an example embodiment may include or otherwise be in communication with one or more of a processor 102, a memory 104, a communication interface 106, a user interface 108, a camera 110 and a sensor 112. In some embodiments, the processor (and/or co-processors or any other processing circuitry assisting or otherwise associated with the processor) may be in communication with the memory device via a bus for passing information among components of the apparatus. The memory device may include, for example, a non-transitory memory, such as one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

In some embodiments, the apparatus 100 may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 102 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 102 may be configured to execute instructions stored in the memory device 104 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

Meanwhile, the communication interface 106 may be any means such as a device or circuitry embodied in either hardware or a combination of hardware and software that is configured to receive and/or transmit data from/to a network and/or any other device or module in communication with the apparatus 100, such as by supporting communications with a display and/or a mobile terminal. In this regard, the communication interface may include, for example, an antenna (or multiple antennas) and supporting hardware and/or software for enabling communications with a wireless communication network. For example, the communication interface 106 may enable access to an infinite link layer network as described below with respect to FIG. 2. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

The apparatus 100 may include a user interface 108 that may, in turn, be in communication with the processor 102 to provide output to the user and, in some embodiments, to receive an indication of a user input. For example, the user interface may include a display and, in some embodiments, may also include a keyboard, a mouse, a joystick, a touch screen, touch areas, soft keys, a microphone, a speaker, or other input/output mechanisms. In one embodiment, the display of the apparatus may be embodied by a liquid crystal display (LCD) screen presented on one surface of the mobile terminal. The processor 102 may comprise user interface circuitry configured to control at least some functions of one or more user interface elements such as a display and, in some embodiments, a speaker, ringer, microphone and/or the like. The processor 102 and/or user interface circuitry comprising the processor 102 may be configured to control one or more functions of one or more user interface elements through computer program instructions (e.g., software and/or firmware) stored on a memory accessible to the processor (e.g., memory 104, and/or the like).

In some example embodiments, the apparatus 100 may include an image capturing element, such as a camera 110, video and/or audio module, in communication with the processor 102. The image capturing element may be any means for capturing an image, video and/or audio for storage, display or transmission. For example, in an example embodiment in which the image capturing element is a camera, the camera may include a digital camera capable of forming a digital image file from a captured image. As such, the camera may include all hardware (for example, a lens or other optical component(s), image sensor, image signal processor, and/or the like) and software necessary for creating a digital image file from a captured image. The encoder and/or decoder may encode and/or decode according to, for example, a joint photographic experts group (JPEG) standard, a moving picture experts group (MPEG) standard, or other format.

As shown in FIG. 1, the apparatus 100 may also include one or more sensors 112, such as a location information receiver (e.g., a GPS receiver), an accelerometer, a gyroscope, a compass, or the like, that may be in communication with the processor 102 and may be configured to determine the location of the apparatus and to detect changes in motion and/or orientation of the apparatus.

The method, apparatus 100 and computer program product may now be described in conjunction with the operations illustrated in FIGS. 2-3. In this regard, the apparatus 100 may include means, such as the processor 102, the camera 110 or the like, for selecting a router. The processor 102 may measure one or more network link layer metrics for one or more routers in communication with the apparatus 100. The processor 102 may select one of the routers for communication based on the network link layer metrics, thus ensuring optimal selection of a router such that communication efficiency may be improved, such as by being maximized for an infinite link later environment.

Figure 2:
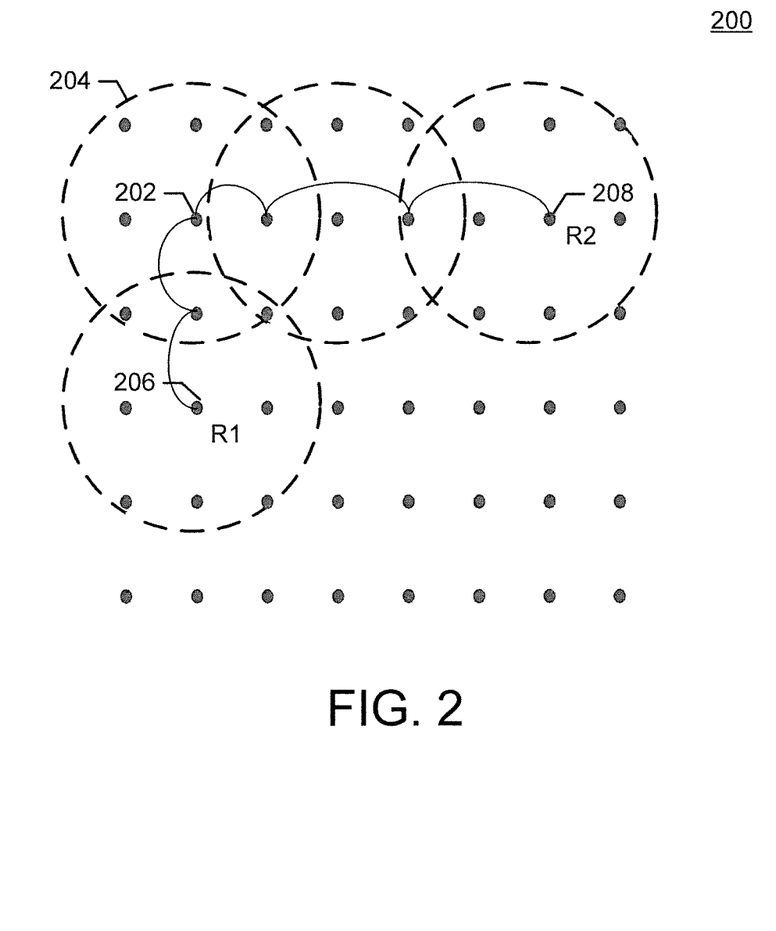
FIG. 2 is a schematic diagram depicting an example of a network in accordance with an example embodiment of the present invention.

FIG. 2 is a schematic diagram depicting an example of a network 200 in accordance with an example embodiment of the present invention. The network 200 may be implemented as an infinite link layer network (e.g., the network link layer implemented as a mesh network), where each node of the network may address every other node via the link layer. The network 200 may be comprised of a series of nodes, with each node communicating with other nodes that are within a particular range 204 of one another. The instant network diagram illustrates communication of a source node 202 (e.g., a mobile terminal, such as the apparatus 100) that has a particular communication range 204. The communication range shows the nodes to and from which the source node 202 may directly send and receive messages. In order for the source node 202 to communicate with nodes outside the communication range 204, the transmission may be relayed to a first node within the communication range 204, then to a second node within a communication range of the first node, then to a third node within the communication range of the second node, and so on. Thus, communication with nodes outside of the communication range 204 of the source node 202 may require an increasing number of relays, as in some embodiments the communication may be relayed to all nodes within the communication range 204 of the source node. Relay of the signal to all nodes may be required as the source node 202 may not be aware of which intermediate nodes are capable of communicating with an intended destination node.

The source node 202 may wish to communicate with a node outside of the network 200. In order to communicate with such an external node, the source node 202 may route the communication through a router. The network 200 may thus include one or more routers that act as a gateway to one or more nodes that are not part of the infinite link network 200. The source node 202 may be able to communicate with a plurality of these routers and, as such, the source node 202 may select one of the plurality of routers to communicate the message to the external node. In the present example, the source node 202 is within communication range of two routers, a first router 206 and a second router 208. Although only two routers are described with respect to this example, the network 200 may include any number of routers, some of which the source node 202 may not be operable with which to communicate. For example, the network 200 may be configured for relaying messages for three hops after the source node, and a router may be located four hops away. As such, the source node 202 must identify nearby routers and select a router based on with which routers the source node 202 may communicate.

One such method of selecting a router with which to communicate is by identifying link layer metrics between the source node 202 and each router 206, 208. For example, the source node 202 may determine how many hops are necessary to communicate with each router, and select a router based on the number of hops. The fewer hops that are necessary to communicate with the router, the closer the router is likely to be to the source node. In this manner, the source node 202 may select a router that minimizes the number of relays necessary to communicate with the router, thus conserving network resources.

Other methods may also be employed to determine link layer metrics for each router. For example, the source node may measure the time it takes to receive a message in reply to a registration of the source node with the router (e.g., a Neighbor Advertisement message received in reply to a Neighbor Solicitation message according to the Internet Control Message Protocol v6 (ICMPv6) standard). Messaging in this manner may also serve to minimize signaling related to Internet Protocol v6 (IPv6) Duplicate Address Detection procedures, thus helping to avoid address conflicts as routers defend the source node's registered link layer address and therefore decrease signaling traffic in the network 200. In yet further embodiments, the link layer metrics may also or alternatively include energy consumption to communicate with each router, or radio path characteristics (e.g., radio signal attenuation) for communications with each router. For example, a router that is around a corner from the source node may be physically closest to the source node, but the wall connected with the corner may block radio signals and hence it may be optimal for the source node to communicate with another router, such as a router with direct line of sight.

In some embodiments, the source node may identify a distance between the host and each router by monitoring the time it takes for an ICMPv6 Router Advertisement to be received by the source node in response to a ICMPv6 Router Solicitation Message, or the time it takes to receive a Dynamic Host Change Protocol (DHCP) DHCPOFFER message in response to a DHCPDISCOVER message. In yet further embodiments, the source node may measure a distance to each router by performing a ping test (e.g., by sending an ICMP Echo Request) to nearby routers and measuring the amount of time it takes to receive a response to the ping test.

In the present example of the network 200, the first router 206 is located two hops away from the source node 202, and the second router 208 is located three hops away from the source node. According to example embodiments of the invention, the source node 202 may identify the number of hops required to communicate with each router, and select the router which requires fewer network hops. In this case, the source node 202 may select the first router 206 for routing communications with a network for which the first router 206 acts as a gateway (e.g., the Internet). The source node 202 may configure itself to select the first router by modifying a router selection operation such as, for example, an IP Source Address Selection operation.

Figure 3:
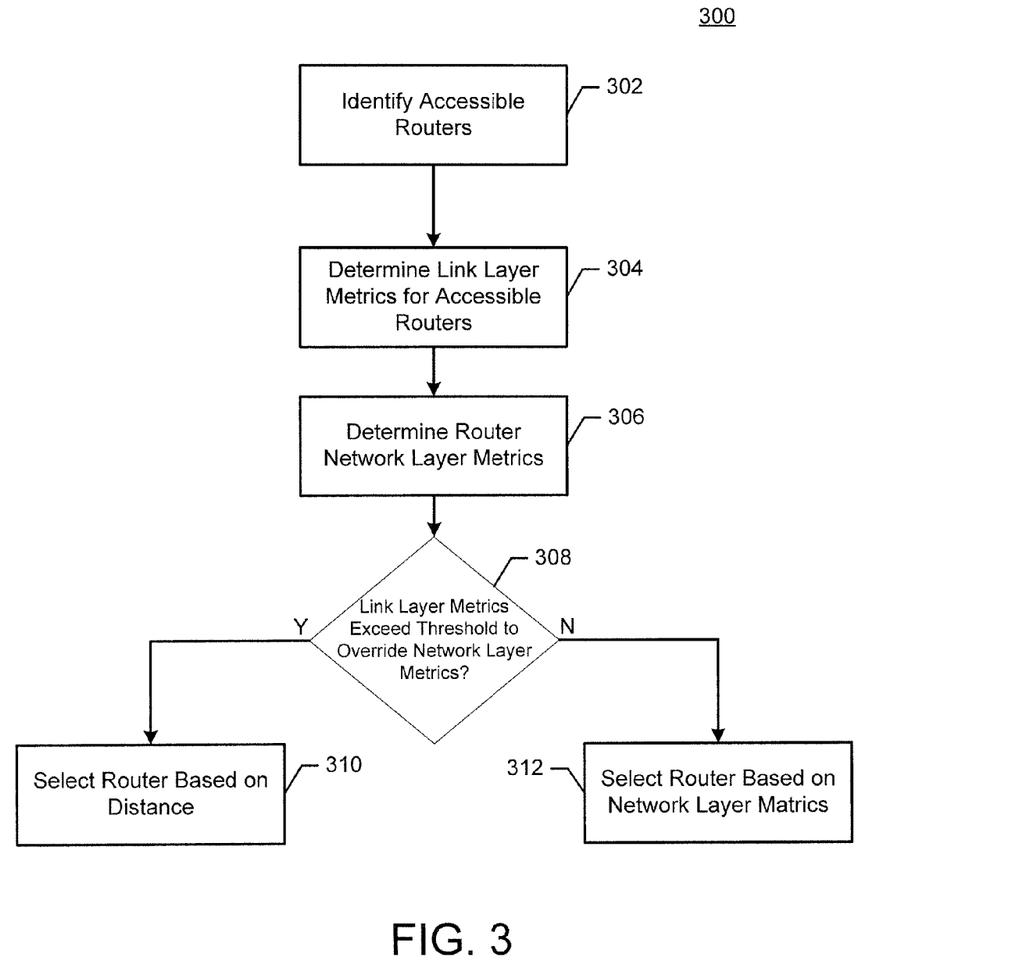
FIG. 3 is a flow diagram illustrating an example of a method for selecting a router in an infinite link environment in accordance with an example embodiment of the present invention.

FIG. 3 is a flow diagram illustrating an example of a method 300 for selecting a router in an infinite link environment in accordance with an example embodiment of the present invention. The method 300 is operable to enable a device, such as a mobile terminal as described with respect to the apparatus 100, to select a particular router or routers in an infinite link environment based on link layer metrics associated with the selected router. The mobile terminal may determine the link layer metrics for each router that is accessible to the mobile terminal, and select a router with favorable link layer metrics. In some embodiments, the mobile terminal may also use network layer metrics in the process of selecting a router, and the network layer metrics may be used in conjunction with the link layer metrics. In some embodiments, the link layer metrics may override the network layer metrics if the link layer metrics exceed a particular threshold value. The method 300 may be performed by a processing means, such as the processor 102 described with respect to the apparatus 100.

At action 302, routers that are accessible to the mobile terminal may be identified. As described above with respect to FIG. 2, a particular network node (e.g., the mobile terminal) may not be able to communicate with all nodes of the network for various reasons (e.g., due to packet relay limitations employed to conserve network resources). As such, the mobile terminal may identify with which of a plurality of routers that mobile terminal is able to communicate. This may be accomplished by sending a solicitation from the mobile terminal and identifying the routers based on received advertisements, or by another other method of identifying routers in the network. Accessible routers may be identified by a processing means, such as the processor 102.

At action 304, link layer metrics for the accessible routers may be determined. For example, the mobile terminal may determine a distance between the mobile terminal and each router as described with respect to FIG. 2. The mobile terminal may determine a number of hops between the mobile terminal and each router, a ping latency between the mobile terminal and the router, or the like. Additionally or alternatively, the mobile terminal may also identify other link layer metrics, such as energy consumption to communicate with each router or radio path characteristics for each router. Link layer metrics may be determined by a processing means, such as the processor 102.

At action 306, network layer metrics for each of the routers may be determined. As described above, embodiments of the invention may use both link and network layer metrics to decide which of the accessible routers to select. For example, routers in the network may be assigned priority levels, such that a given router is assigned a low priority, a medium priority, a high priority, or the like. Router priority may be defined in accordance with certain standards, such as Internet Engineering Task Force (IETF) RFC4191, section 2.1. Other network layer metrics may include valid or preferred lifetimes of IPv6 prefixes advertised by routers, rules received dynamically that alter address selection preferences (see, e.g., Draft IETF Distributing Address Selection Policy Using DHCPv6 Standard Proposal), and/or router lifetimes as defined in IETF RFC4861, section 4.2. In some embodiments, a router may be selected based on link layer metrics without involving network layer metrics, and as such the network layer metrics may not be gathered as described at action 306. Network layer metrics may be determined by a processing means, such as the processor 102.

At action 308, the network layer metrics and link layer metrics may be processed, and further processing of the method may depend upon the relationship between the metrics. For example, the method 300 may arbitrate between network and link layer metrics that might cause a selection of different routers. In an example, a first router may be physically closer to the source node, but assigned a low priority, and a second router may be assigned a higher priority level but be located farther from the source node. In such an environment, the router might select the farther router, due to the priority metric causing an override when comparing a "low" priority router to a "medium" or "high" priority router. Alternatively, in the same example, but with the closer router assigned a "medium" priority and the farther router assigned a "high" priority, the closer proximity might override the priority metric. In some embodiments, different metric values are assigned different weights for the selection process, such that certain link layer metrics may override certain network layer metrics, and vice-versa. The determination as to whether one set of metrics override another may be performed by a processing means, such as the processor 102.

At action 310, a router may be selected based on the distance as described with respect to the link layer metrics. For example, a nearest router in terms of network hops or a router with a lowest ping latency may be selected as a default router. In some embodiments, the closest router is selected this way in response to a tie among other metrics (e.g., selection among two routers with the same priority). Selection of a closest router in this manner may have the benefit of conserving network resources by minimizing relaying of data (e.g., by minimizing hops). The router selection may be performed by a processing means, such as the processor 102. The router may be selected by modification of a Source Address Selection process, as described above.

At action 312, the router may be selected based on network metrics, such as the router priority if the link layer metrics do not override the network layer metrics. In this manner, the mobile terminal may select a router that is optimized for the network layer, such as based on a source to destination routing (e.g., a destination node that has a shortest route across the selected router) or by some other network layer criteria. The selection based on network layer metrics may be performed by a processing means, such as the processor 102.

It will be understood that each block of the flowchart, and combinations of blocks in the flowchart, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory 104 of an apparatus employing an embodiment of the present invention and executed by a processor 102 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
   identifying at least two routers accessible to a source node via a mesh network;
   determining one or more link layer metrics for links between the source node and each of the at least two routers;
   determining network layers metrics for the at least two routers;
   determining that the link layer metrics override the network layer metrics;
   determining, using the link layers metrics, a selected router from among the at least two routers for routing traffic from the source node to a network other than the mesh network in response to the link layer metrics overriding the network layer metrics; and
   causing traffic to be routed from the source node to the network other than the mesh network through the selected router in response to determining the selected router from among the at least two routers.

2. The method of claim 1, wherein the link layer metrics serve as a tie-breaker when there is a tie among the at least two routers based on the network layer metrics.

3. The method of claim 1, wherein the network layer metrics comprise a priority level for reach router.

4. The method of claim 1, wherein the link layer metrics comprise a number of hops between the source node and each of the at least two routers, and wherein the selected router is the router associated with the least number of hops.

5. The method of claim 1, wherein the routing operation is performed according to a Source Address Selection process and the Source Address Selection process is modified in response to determining the selected router.

6. The method of claim 1, wherein the mesh network is an infinite link layer network.

7. The method of claim 1, wherein the link layer metric is at least one of a physical distance, a hop count, an energy consumption value, or a radio path characteristic.

8. An apparatus comprising at least one processor and at least one memory including computer program instructions, the at least one memory and the computer program instructions configured to, with the at least one processor, cause the apparatus at least to:
   identify at least two routers accessible to the apparatus via a mesh network;
   determine one or more link layer metrics for links between the apparatus and each of the at least two routers;
   determine network layer metrics for the at least two routers;
   determine that the link layers metrics override the network layers metrics;
   determining, using the link layer metrics, a selected router from among the at least two routers for routing traffic from the apparatus to a network other than the mesh network in response to the link layer metrics overriding the network layer metrics; and
   cause traffic to be routed from the apparatus to the network other than the mesh network through the selected router in response to determining the selected router from among the at least two routers.

9. The apparatus of claim 8, wherein the link layer metrics serve as a tie-breaker when there is a tie among the at least two routers based on the network layer metrics.

10. The apparatus of claim 8, wherein the network layer metrics comprise a priority level for reach router.

11. The apparatus of claim 8, wherein the link layer metrics comprise a number of hops between the apparatus and each of the at least two routers, and wherein the selected router is the router associated with the least number of hops.

12. The apparatus of claim 8, wherein the routing operation is performed according to a Source Address Selection process and the Source Address Selection process is modified in response to determining the selected router.

13. The apparatus of claim 8, wherein the mesh network is an infinite link layer network.

14. The apparatus of claim 8, wherein the link layer metric is at least one of a physical distance, a hop count, an energy consumption value, or a radio path characteristic.

15. A computer program product comprising at least one non-transitory computer-readable storage medium bearing computer program instructions embodied therein for use with a computer, the computer program instructions comprising program instructions configured to:
 identify at least two routers accessible to a source node via a mesh network;
 determine one or more link layer metrics for links between the source node and each of the at least two routers;
 determining network layer metrics for the at least two routers;
 determine that the link layers metrics override the network layer metrics;
 determine, using the link layers metrics, a selected router from among the at least two routers for routing traffic from the source node to a network other than the mesh network in response to the link layer metrics overriding the network layer metrics; and
 cause traffic to be routed from the source node to the network other than the mesh network through the selected router in response to determining the selected router from among the at least two routers.

16. The computer program product of claim 15, wherein the link layer metrics serve as a tie-breaker when there is a tie among the at least two routers based on the network layer metrics.

17. The computer program product of claim 15, wherein the network layer metrics comprise a priority level for reach router.

\* \* \* \* \*

UNITED STATES PATENT AND TRADEMARK OFFICE
CERTIFICATE OF CORRECTION

PATENT NO. : 9,584,400 B2
APPLICATION NO. : 14/417281
DATED : February 28, 2017
INVENTOR(S) : Savolainen Page 1 of 1

It is certified that error appears in the above-identified patent and that said Letters Patent is hereby corrected as shown below:

In the Claims

Column 12,
Lines 4, 8, 48 and 49, "layers", each occurrence, should read --layer--;
Line 50, "determining" should read --determine--.

Column 13,
Line 20, "determining" should read --determine--.

Column 14,
Lines 1 and 3, "layers", each occurrence, should read --layer--.

Signed and Sealed this
Fourteenth Day of November, 2017

Joseph Matal
*Performing the Functions and Duties of the*
*Under Secretary of Commerce for Intellectual Property and*
*Director of the United States Patent and Trademark Office*